(12) United States Patent
Klaiber et al.

(10) Patent No.: US 11,303,451 B2
(45) Date of Patent: Apr. 12, 2022

(54) SYSTEM FOR AUTHENTICATION (71) Applicant: STRATEC SE, Birkenfeld (DE)

(72) Inventors: Bernd Klaiber, Straubenhardt (DE); Simona Catana, Carei (RO)

(73) Assignee: STRATEC SE, Birkenfeld (DE)

( * ) Notice: Subject to any disclaimer, the term of this patent is extended or adjusted under 35 U.S.C. 154(b) by 0 days.

(21) Appl. No.: 16/747,168

(22) Filed: Jan. 20, 2020

(65) Prior Publication Data
US 2020/0235931 A1 Jul. 23, 2020

(30) Foreign Application Priority Data
Jan. 18, 2019 (GB) .................................... 1900692

(51) Int. Cl.
H04L 29/06 (2006.01)
H04L 9/32 (2006.01)
H04L 9/08 (2006.01)
H04L 9/30 (2006.01)

(52) U.S. Cl.
CPC .......... *H04L 9/3228* (2013.01); *H04L 9/0869* (2013.01); *H04L 9/30* (2013.01)

(58) Field of Classification Search
CPC ........... H04L 63/0853; H04L 2463/082; H04L 9/3228; H04L 9/0869; H04L 9/30; G06F 21/34; G06F 21/42
See application file for complete search history.

(56) References Cited

U.S. PATENT DOCUMENTS

| | | | | |
|---|---|---|---|---|
| 5,943,423 A | * | 8/1999 | Muftic | G06Q 20/3674 705/67 |
| 2007/0107050 A1 | | 5/2007 | Selvarajan | |
| 2010/0100725 A1 | | 4/2010 | Ozzie et al. | |
| 2010/0299517 A1 | * | 11/2010 | Jukic | H04L 12/2809 713/150 |
| 2010/0325435 A1 | * | 12/2010 | Park | H04L 9/3213 713/171 |
| 2014/0007196 A1 | | 1/2014 | Lin | |
| 2015/0237031 A1 | * | 8/2015 | Neuman | H04L 63/0876 713/176 |
| 2017/0279795 A1 | * | 9/2017 | Redberg | H04L 63/0861 |
| 2020/0169406 A1 | * | 5/2020 | Liu | H04L 63/083 |

FOREIGN PATENT DOCUMENTS

| | | |
|---|---|---|
| EP | 1445917 A2 | 8/2004 |
| GB | 2300288 A | 10/1996 |

* cited by examiner

*Primary Examiner* — Thaddeus J Plecha
(74) *Attorney, Agent, or Firm* — 24IP Law Group USA, PLLC; Timothy Dewitt (57) ABSTRACT A work authorization system comprising a credential provider which is installed on a data processing unit of an automated analyzer instrument comprising a device for entering data, a server comprising an interface for receiving data from the credential provider and information for authentication of a user, a database containing all relevant data necessary for authentication of the user and a device for sending messages.

9 Claims, 4 Drawing Sheets

SYSTEM FOR AUTHENTICATION

CROSS-REFERENCE TO RELATED APPLICATIONS

The present invention claims priority to national UK Patent Application No. GB 1900692.3 filed on Jan. 18, 2019. The aforementioned application is incorporated herein by reference in its entirety.

BACKGROUND OF THE INVENTION

Field of the Invention

The invention relates to a system for authentication.

Brief Description of the Related Art

Automated analyser systems for use in clinical diagnostics and life sciences are produced by a number of companies. For example, the STRATEC® Biomedical AG, Birkenfeld, Germany, produces a number of devices for specimen handling and detection for use in automated analyser systems and other laboratory instrumentation.

The use of such biomedical devices is often restricted so that only trained people can work with the device. A quite common method for authentication into biomedical devices is to use the combination of a username and password. When looking from the perspective of the used factors, it appears that this choice implies the usage of only a single factor, the knowledge. Thus, this method is these days considered to be unsafe, because the use of a static combination of username and password is vulnerable to misuse when more than one person is using the system. The probability of misuse increases with the number of persons knowing such a static combination. Field service engineers for instance will all have to know the respective combination of username and password for a single device. Thus, it is likely that username and password will become available to unauthorized persons.

Providing a maximum security for authorized personal becomes even more difficult if it is considered that the system may be located anywhere in the world and login into the systems is performed via remote access. The login data transfer represents another source for necessary login data to become available for unauthorized people.

U.S. Published Patent Application No. US 2014/007196 A1 discloses a device that receives an indication that a security code is to be generated; generates the security code based on the indication; generate a message that includes the security code and an identifier associated with a subscriber of the device; outputs the message using the first protocol; encodes the security code based on outputting the message; and outputs a request to access the service. The request is outputted using a second protocol and includes the encoded security code and the identifier. The device receives a notification that indicates whether the subscriber is authenticated based on the identifier, the security code, and the encoded security code; and accesses the service when the notification indicates that the subscriber is authenticated.

In published European Patent Application No. EP 1 445 917 A2 teaches an identification system that uses an additional key for admission, to applications or user programs, to web sites on internet or intranet, and as additional lock beside conventional security devices for restricted premises. The essential feature of the identification system according to this document is in that the user supplies beside his/her regular username and password an additional, randomly generated password, which is sent to his/her mobile phone number by the identification system in the form of an SMS message after the identification systems receives the regular username and password from the user. Additional security is ensured by time-limited usability of the said SMS key and by limited repetition of access attempts.

U.S. Published Patent Application No. 2010/0100725 A1 refers to providing a remote computer user authentication service involves providing a reference to a user authentication service in a host server's source code (e.g., website source code). Further, integration code that may be used in an application programming interface (API) on the host server for interaction with a user authentication service can be provided. Additionally, a user interface (UI) for user authentication on the host server, and an authentication-test message on the host server using the UI may be provided. Also, providing authentication can comprise sending an authentication-request message to a mobile device designated by the user; and/or can comprise the user responding with information from the authentication-test message. The host server can be notified of the user's authentication after a correct response is received by the user authentication service.

Published UK Patent Application No. GB 2 300 288 A discloses a method of preventing unauthorised access to a host computer system by a user at a remote terminal is provided using paging system technology. In the method, a user inputs his user identification code input into the terminal which transmits same to the host computer system. The system then generates a random code (Code A) and subjects Code A to a transformation characteristic of a transformation algorithm identified by the input user identification code so as to generate a transformed code (Code B). Code A is transmitted via a paging system, to a receiver held by the user. The receiver comprises transformation means adapted to transform the received Code A to a second transformed code (Code C) and means for displaying Code C to the user. The user then inputs the displayed Code C to the terminal which transmits it to the host system. The input Code C is then compared with Code B and access is only permitted if Code C matches Code B.

SUMMARY OF THE INVENTION

It is an object of the present invention to provide a method allowing authorized personal to login easily into a system but providing a maximum security.

The present disclosure relates to a work authorization system comprising a credential provider which is installed on a data processing unit of an automated analyzer instrument, comprising a device for entering data, a server comprising an interface for receiving data from the credential provider and information for authentication of a user, a database containing all relevant data necessary for authentication of the user and a device for sending messages.

In another embodiment of the invention, the credential provider may comprise a device for generating a random number.

It is further envisaged that the credential provider further comprises a public key for encrypting data prior to transmitting, According to the invention it is intended that the server may comprise a private key for decrypting transmitted data encrypted with the public key of the credential provider.

The automated analyser may comprise a device for displaying messages in another aspect of the invention.

In a further embodiment of the invention the system may comprise a mobile device for receiving messages from the server.

Another object of the present invention is a method for authentication and authorization on an automated analyzer system, comprising the steps of
  a. Entering the combination of a user ID and password into a device connected with the automated analyser system by a person for requesting authentication and authorization;
  b. Generating a random number by a credential provider;
  c. Encrypting the combination of user ID and password as well as the random number prior to transmitting it to a server;
  d. Decrypting the encrypted combination of user ID and password as well as the random number;
  e. Verifying the decrypted data by comparison with data stored in a database located at the server; and
  f. Depending on the result of the verification step
  g. Not verified: Generating a message informing about a failed authentication and authorization; or
  h. Verified: Sending the random number to the person requesting authentication and authorization
  i. Entering the random number with the automated analyser system;
  j. Comparison whether the generated number from step b and step g are identical
  k. Authorizing the person in case that the correct random umber has been entered.

The method may further encompass that the combination of user ID and password as well as the random number can be encrypted with a public key.

In a further aspect of the invented method, the combination of user ID and password as well as the random number can be decrypted the with a private key.

The method may further encompass that a message informing about a failure of authentication and authorization may be sent to a mobile phone related to the user ID.

In another aspect of the method according to the invention, the random number can be device specific.

It may furthermore be intended that the encrypted data will be sent directly to the server if the automated analyser is online.

The method of the invention may further encompass that a 2D barcode will be generated is the automated analyser system is offline.

A display of the automated analyser may be used to show the 2D barcode.

It is further intended that a 2D barcode can be read by a mobile phone related to the user ID for transmitting it to the server in step c of claim 7.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The technical problem is solved by the independent claims. The dependent claims cover further specific embodiments of the invention.

The present invention describes a system comprising a credential provider, a server and a database were developed in order to address the above discussed problem of security and in order to offer a more secure authentication solution for companies in the biomedical field. In the next sections will be offered more details about the developed system, starting from the beginning, when design decisions had to be taken, and reaching in the end at the installation and configuration process.

The first task relates to the number of authentication factors which shall be required by the system. It has been intended to make a transition from the traditional authentication alternatives requiring only a single factor, the knowledge. Thus, the method of the present invention adds an extra layer of security by requiring an additional possession factor.

The chosen authentication factors are the following:
  a. From the Knowledge category: User ID and Password. The Field Service Engineer (FSE) will have to prove knowledge of his User ID and Password at the beginning of the authentication process;
  b. From the Possession category: Mobile phone. The FSE will receive a code on his mobile phone (more exact: to the SIM Card registered with his phone number) that will have to be inserted in the Login interface.

In order to design a secure and reliable two-factor authentication system by using a knowledge and possession factor, a decision had to be made what components the final system shall contain and how they will have to interact in order to provide the desired functionality.

The implemented system contains two important parts for communication: A Credential Provider (client) and a Web API (server).

A cryptographic public-key algorithm, called RSA, was incorporated into a two-factor authentication system for obtaining the required security level.

The public-key algorithm implements the usage of a public and a private key. The private key will have to be kept secret at the server's side, and the public key shall be freely distributed to any of the biomedical devices on which the authentication system will be used.

It is important to mention that the implemented solution does not restrict the usage of other Public-key algorithms.

The system has been designed to allow the incorporation of other algorithms, without affecting the general workflow.

The cryptographic algorithm is used in the developed system as follows:

A random number, along with the Field Service Engineer's User ID and Password, is encrypted by using the Public Key from the instrument.

The encrypted data is sent to the server;

The server decrypts the data with the Private Key;

If the Field Service Engineer is successfully authenticated and authorized, then the decrypted random number is sent to the FSE's mobile phone via SMS;

The FSE enters the number in the login interface on the instrument, in order to check its validity.

This workflow differs from a known standard usage where individuals shall be authenticated at an identical central server, e.g. a server for banking. The present invention refers to a system for login into a medical instrument. The difference is that multiple users shall be authenticated, but always with as the same user on the device (FSE Role) and not as different users having different access.

For safety reasons it is not advisable to store the relevant key on the device, because there are high numbers of devices spread all over the world. Thus, a new workflow has been developed instead of using known workflows.

The invention will now be described in workflows to provide a clear separation between the general perspective, the data sending scenarios, the data receiving scenarios and the authentication and authorization process.

The workflows contain several alternatives to address the problem that not all intended forms of communication may be available, e.g. the instrument may not be connected to the internet.

Figure 1:
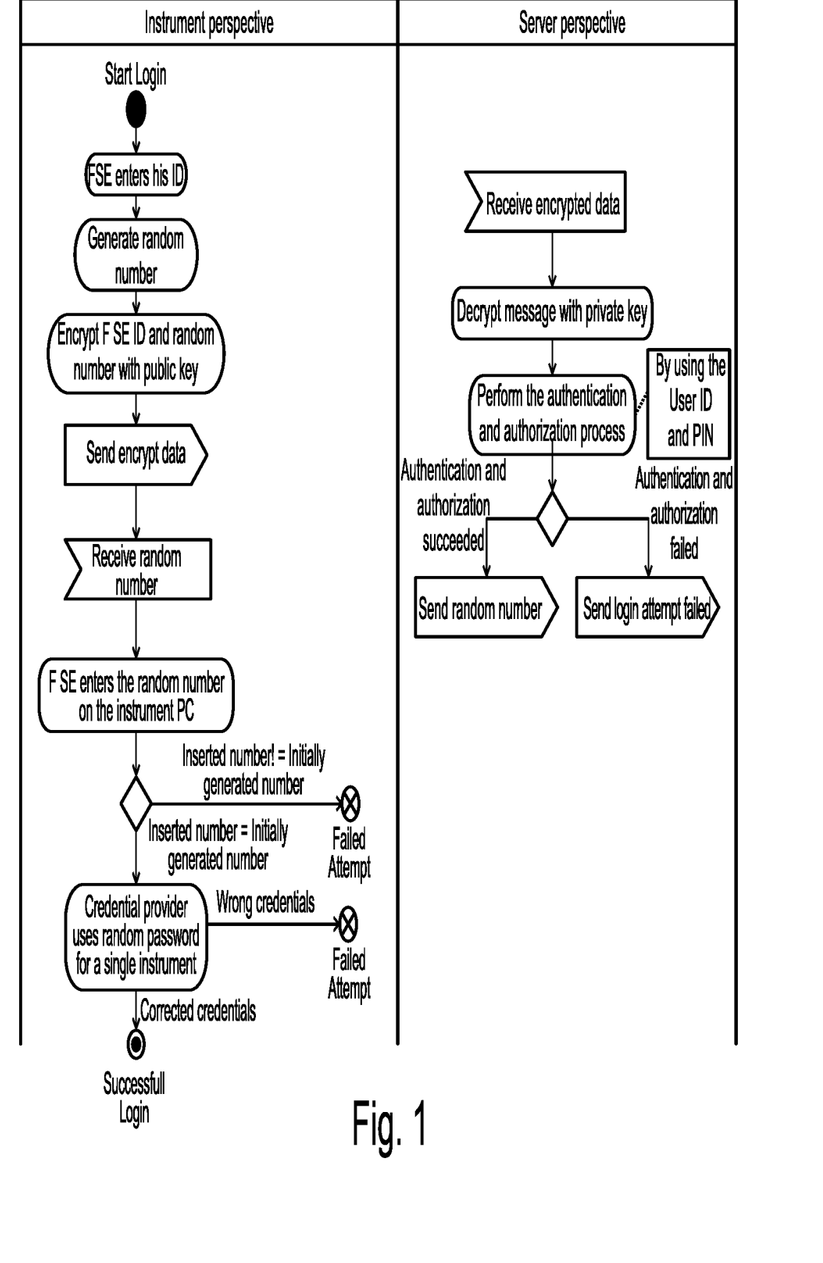
FIG. 1 shows a workflow of instrument's perspective and the server's perspective.
Figure 2:
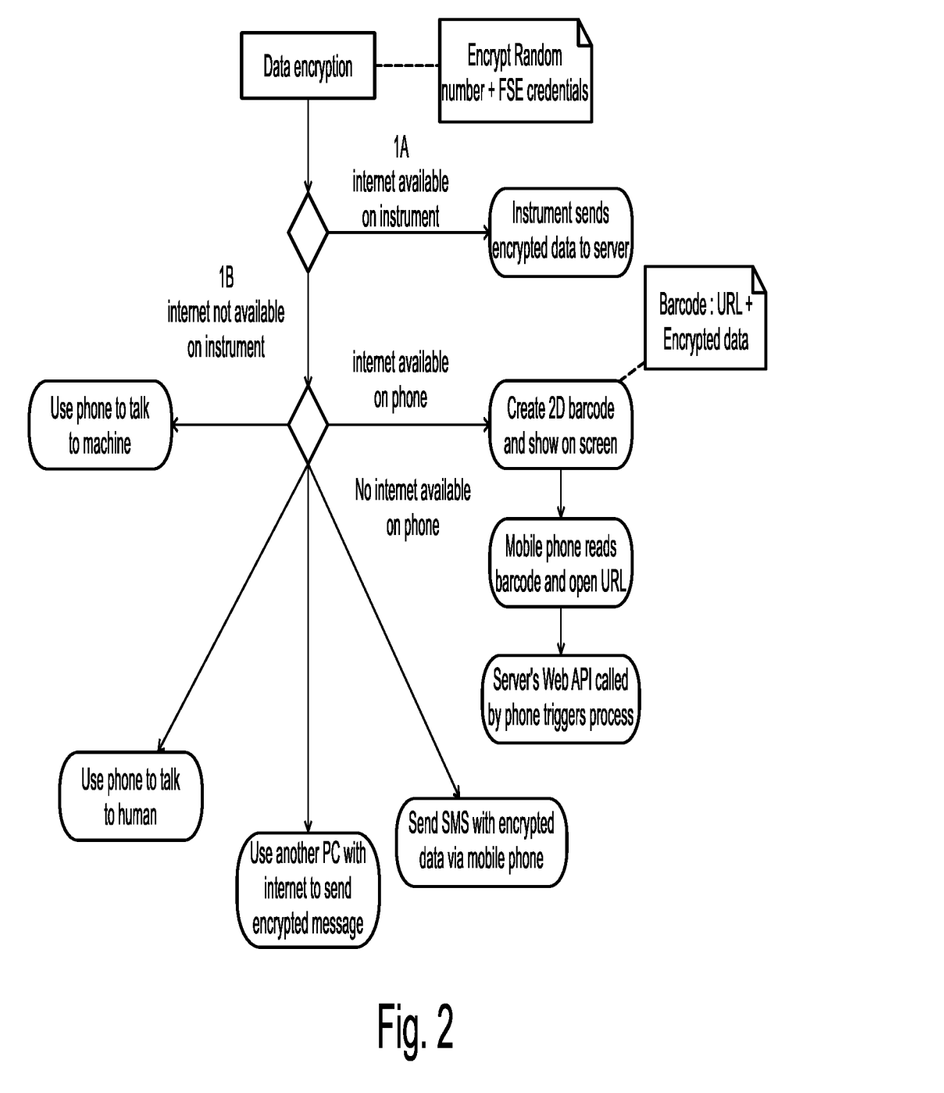
FIG. 2 shows sending scenarios supported by a complex authentication system.

FIG. 1 shows a workflow of the present invention from a general perspective including an instrument's perspective, meaning communication with the instrument and the server's perspective regarding communication with the server. FIG. 2 shows sending scenarios and FIG. 3 receiving scenarios.

From a general perspective, the instrument's perspective can be summarized by the following sequence of steps:

Step 1: At the beginning, when the Field Service Engineer decides to login into the biomedical device, he enters his User ID and PIN, and clicks 'Send Data';

Step 2: Before the data is sent, the Credential Provider application generates a random number;

Step 3: The credentials entered by the Field Service Engineer (User ID and PIN) and also the random number generated in step 2, are encrypted with a public key;

Step 4: The encrypted data is sent to the server, by using one of the methods presented in the sending scenarios in FIG. 2. The sending scenarios specify explicit scenarios which are supported according to the invention;

The server's perspective can be summarized by the following sequence of steps:

Step 5: The encrypted data is received by the server;

Step 6: The server decrypts the message using a private key. The decrypted message contains the credentials and the random number encrypted at the instrument's side;

Step 7: For controlling the FSE's identity, the credentials are verified by the server. An authorization step follows this authentication step, because even if the Field Service Engineer's data will be found in the database, and even if it is correct, he may not be authorized to login into the instrument;

Step 8: The authorization step comprises the authentication and authorization response. In case the Field Service Engineer is not authenticated or authorized successfully, a message will be generated for informing that the attempt to login failed and the workflow will end; otherwise step 9 follows.

The instrument perspective may further comprise the steps of

Step 9: Successful authentication and authorization on the server's side, the user receives the random number by using one of the methods presented in the Receiving scenarios diagram from FIG. 3;

Step 10: The Field Service Engineer enters the decrypted random number that he received into the login interface of the instrument;

Step 11: The Credential Provider application installed on the instrument checks if the number entered by the FSE matches the random number generated in step 2. In case they do not match, the login attempt fails. Otherwise, the FSE is successfully logged into the biomedical device.

The last step of the authentication process requires a correct random number to be entered. It is to be noted that a secure random number or password is generated for each device during a login process. So even if someone manages to retrieve a random number or password for a specific device, it will be useless for login on other instruments. The password is highly secured and stored with access rights in the instrument's registry, so only the credential provider and an administrator will be able to access it. The logging process may also be possible by sending the generated random number or password directly to the (laboratory) administrator.

FIG. 2 illustrates sending scenarios which may be supported by a complex authentication system. The sending scenarios implement sending the data which was encrypted on the instrument's side to the server.

FIG. 2 shows that after encrypting User ID, PIN and random number, the data is transmitted to the server. The following two scenarios have to be distinguished depending on whether the instrument is online:

1A: If the instrument is online, the encrypted data will be sent directly to the server.

1B: If the instrument is offline, a 2D barcode will be created, which incorporates the URL to be used for sending the data, along with the encrypted data as a parameter. In this case, the generated barcode may be displayed on the login screen of the instrument, in order to be read by using a mobile phone.

The data that needs to be transmitted to the server is an encrypted text. Depending on the used public-key algorithm, the length of the ciphertext may vary, based on the necessary padding added for security reasons. Since the ciphertext will usually be long, the invention provides alternatives avoiding that the user has to note it manually.

Figure 3:
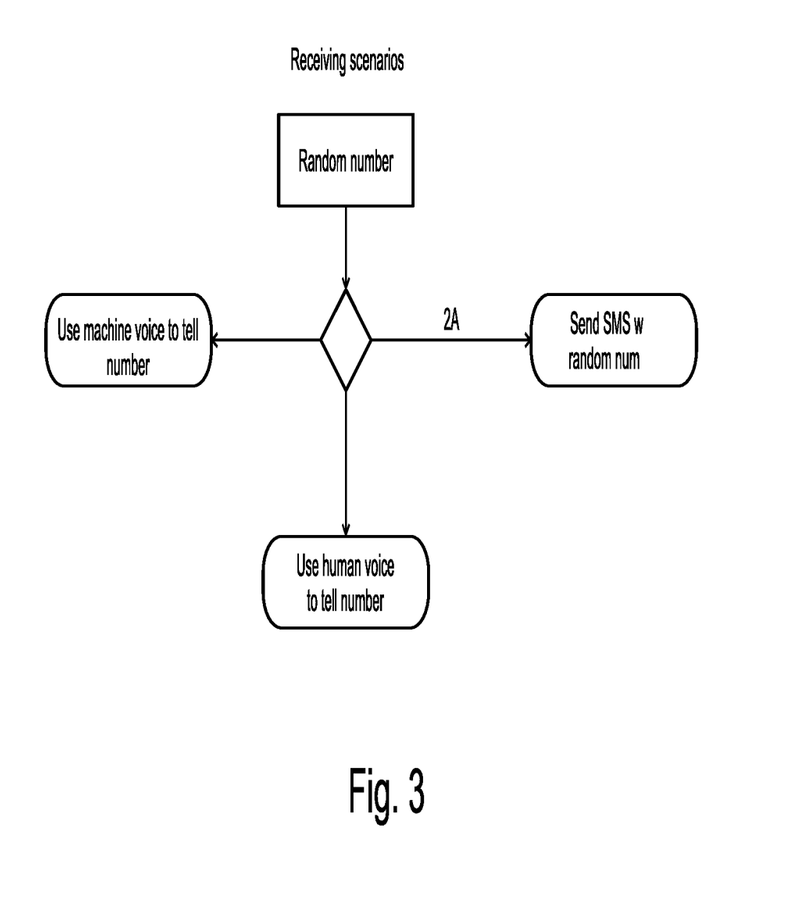
FIG. 3 shows various alternatives for sending back the random number decrypted by the server to the Field Service Engineer

FIG. 3 shows various alternatives for sending back the random number decrypted by the server to the Field Service Engineer. Scenario 2A will be described in more detail without limiting the invention to this scenario.

After the Field Service Engineer is authenticated and authorized successfully by the server, the decrypted random number will be sent to him by sending an SMS message for instance to the FSE's mobile phone number. The mobile phone represents a second factor, a so-called possession factor, from the two-factor authentication system of the present invention.

Step 8 from the general workflow above will now be described in more detail. The authentication and authorization process are performed by the server by using the credentials embedded in the decrypted message. During these processes, the following scenarios may occur.

Figure 4:
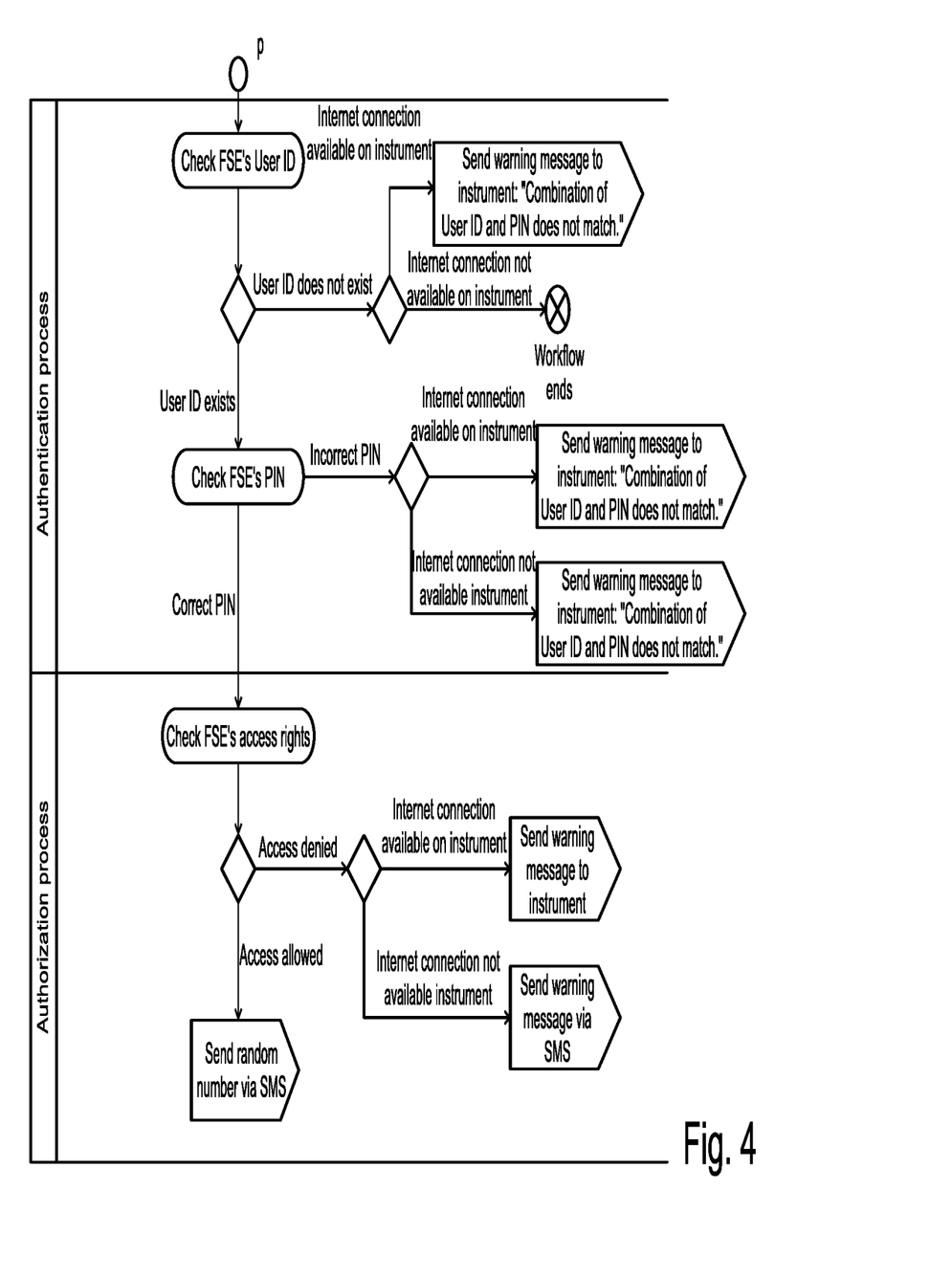
FIG. 4 shows a workflow of the authentication and authorization process

The first scenario represents the successful situation in which authentication and authorization are performed successfully. In this case, the server sends the random number to the Field Service Engineer via SMS by using the mobile phone number associated to him.

Authentication may fail because one of username or password is incorrect. In both possible cases a message will be generated and sent informing that the combination of user ID and PIN does not match. It remains open whether a correct user ID was used increasing the security.

Using a correct user ID with internet connection available results in sending a warning message to the instrument. Using a wrong user ID but having no internet connection will cause no message to be sent, because the user related data are not valid. Using a wrong password when internet connection is available on the instrument, results in sending a warning message to the instrument. In case there is no internet connection available on the instrument, then the warning message will be sent directly to the FES via SMS by using the mobile phone number associated to the User ID informing the FSE that possibly a third person tries to login using his user ID.

When authorization fails, the authentication was successful, but the authorization process failed because the FSE does not have access permissions granted. In this case, like in the others, internet availability on the instrument's side is taken into consideration.

In case internet is available, then a warning message is sent directly to the instrument. Otherwise, the message will be sent to the FSE via SMS, if the phone number is still valid and available.

FIG. 4 shows a workflow of the authentication and authorization process summarizing the above explanations.

Several components are necessary to use the described authentication and authorization, each of them contributing to the invented secure two-factor authentication system. The necessary components are:
  A Credential Provider which is installed on a data processing unit of the instrument. The credential provider allows a personalized two-factor authentication;
  A server—implemented as an ASP.NET Web API—which is responsible for authenticating a Field Service Engineer;
  A database,—containing all the relevant data needed for authenticating a Field Service Engineer.

The first component will be exemplary described when using a Windows operation system with a credential provider that targets the Windows 10 operating system.

This component was implemented as a V2 Credential Provider, which ensures a more user-centric approach by offering the possibility to associate it with a specific user. This choice was influenced by the need to offer a different authentication alternative specifically for the account created for the Field Service Engineers.

Even though Credential Providers are COM-based components, usually written in C++ programming language, the Stratec Credential Provider was developed in C#. This alternative was possible because COM-interop offers the possibility to call .NET code from COM components, and vice-versa.

In order to develop a Credential Provider, there are certain interfaces that need to be implemented. But before using them they have to be exposed to .NET. The Windows SDK contains an IDL file that defines all the interfaces that need to be used. What has to be done is to convert the IDL file to a type library and then convert the type library to a .NET assembly.

What is important to mention is that even though multiple Field Service Engineers are responsible with a certain biomedical device, they will use a common device account. With the old authentication alternative, they would have shared the same credentials, which introduced a high risk of password leak. With the authentication alternative offered by the developed two-factor authentication system, that risk does not exist anymore.

By installing a credential provider according to the present invention on a biomedical device, a new option with the label "Credential Provider" will appear under the Sign-in options section of the operating system's account for the Field Service Engineers.

The FSE will have to select the credential provider of the present invention which increases the security, because the Field Service Engineers will have to enter a combination of user ID and PIN only known by the FSE. These credentials do not represent the credentials associated with the operating system's account, but they represent credentials which are stored in a database on the server's side for login to devices and that are verified by the server.

After entering the User ID and PIN, the FSE should click on 'Send Data'. Internet connection availability will be taken into consideration when performing the next steps of the authentication process.

The FSE is required to enter the random number received on the mobile phone, and then press 'Check code', in order to validate the number.

Without internet connection, the encrypted data cannot be sent directly to the server, so a QR code is generated and displayed in the login interface. This QR code has to be scanned by the FSE's mobile phone. The embedded link will result in sending the necessary information to the server.

After successful authentication and authorization on the server's side, the FSE will receive the random number on the mobile phone and will be asked to enter the random number. When the random number is successfully validated, the FSE will be able to enter the account by clicking on an associated login button.

In order to accomplish the desired functionality of the server, an exemplary application was developed that uses an interface that is hosted on the server's infrastructure. This framework was used in order to be able to use the interface which can be accessed by using the HTTP protocol. The 2D barcode is used to transfer data instead of entering codes.

The setup of a system according to the present invention is based on two interacting components: a client represented by the credential provider and a server with an interface for access. Such a separation is necessary to have a central responsible authority for deciding which Field Service Engineer may authenticate.

The server is also connected to the database containing all necessary information for login a Field Service Engineer. The credential provider has to send encrypted data which consists of User ID, PIN and random number to the FSE. When the 2D Barcode will be read by using the mobile phone, the request will be automatically sent to the server.

The service used for data storage purposes shall be a database, which represents a relational database service with complex characteristics, built on the SQL Server technologies, for instance.

A great advantage of a SQL database is represented by the high level of interoperability, allowing to access it by using the majority of the development environments.

The database used for the developed system contains the following data about multiple field service engineers:
Credentials: User ID and PIN;
Mobile phone number: used for sending a SMS to the Field Service Engineer after the authentication and authorization process from the server's side;
Access rights: providing access only for relevant instruments in terms of an access rights management.

There is no need to have internet connection on the instrument's date processing unit, because the developed system supports also a scenario without internet connection or an online instrument.

The present invention has the advantage that any company which wants to use this authentication system for their instruments, does not have to take into consideration a lot of constraints. The system may be easily implemented. The management of the FSEs and their phone numbers etc. can also be achieved easily on the server in a database using some sort of user interface.

The Credential Provider can be installed on a computer by using an installer. The installer has to be run by a user with administrator privileges, and is responsible for the following:
Establishes a default target account, which is the first administrator from the administrator users on the computer;
In case the user enters a new target account name, it changes the default one;
Stores into the registry the name of the target account, so that the Credential Provider will know to which account will be associated;
Generates a random password for the target FSE account;
Changes the password of the target FSE account;
Stores the password into the registry and sets the access rights;
Registers the Stratec Credential Provider into the computer.

From the user's perspective, the installation is an easy process, because he is required to provide just an optional target account name, in case he wants to change the default one. The rest of the steps are done automatically, without unnecessarily involving the user.

The prior art documents cited above describe classical systems using a two-factor authentication system, in which additional security is achieved by the addition of a second authentication factor (Mobile Phone). Quite often, systems known from the prior art send a code to a mobile phone, which is then additionally entered by the user. For this purpose, appropriate messages have to be sent (via the internet, or over a mobile network). The purpose of such measures is always the same: you want to increase the safety by the second authentication factor.

The present invention serves another objective that is to authenticate to a system in which the user is not known at all. This is an important difference to known systems and avoids the previously used (unsafe) method of a 'secret' static passwords, which is known to every Field Service Engineer and is the same on all devices.

In known systems is the user to be authenticated, which carries out the action. The problem that the present invention solves is that a user intends to log on to an instrument, but the system has no information about the user. The authentication is thus completely outsourced. In the end, the central system can decide if access is allowed. Neither the instrument (target system) has to communicate with the control center (authentication system), nor does the control panel have to communicate with the instrument. This allows access to be granted or denied without having to change the target system. Systems from the prior art can directly access the central user database for obtaining information about the user, which they provide as a server.

The differences between known system s from the prior art and the present. Invention can be summarized as:
It is not the actual user that logs into the device, but always after external authentication an account "FSEAdmin".
The present invention allows to log onto an external device, while the prior art systems log the user directly onto the server (for example, Banking Portals as a web service), which also handles the authentication
The present invention provides an authentication that is completely independent in terms of no communication is necessary between the instrument and authentication server
Secure authentication becomes possible and controllable without having to influence a device in the field.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for authentication and authorization on an automated analyzer system, comprising the steps of:
   a. entering a combination of a user ID and password into a device connected with the automated analyser system by a person for requesting authentication and authorization;
   b. generating a random number by a credential provider;
   c. encrypting the combination of user ID and password as well as the random number prior to transmitting said combination of user ID and password as well as the random number to a server;
   d. decrypting the encrypted combination of user ID and password as well as the random number;
   e. verifying the decrypted data by comparison with data stored in a database located at the server; and
   f. depending on the result of the verification step
      i. not verified: generating a message informing about a failed authentication and authorization; or
      ii. verified: sending the random number to the person requesting authentication and authorization
   g. entering the random number with the automated analyser system;
   h. comparison whether the generated number from step b and step g are identical
   i. authorizing the person in case that the correct random number has been entered.

2. The method of claim 1, wherein the combination of user ID and password as well as the random number are encrypted with a public key.

3. The method of claim 1, wherein the combination of user ID and password as well as the random number are decrypted the with a private key.

4. The method of claim 1, wherein a message informing about a failure of authentication and authorization is sent to a mobile phone related to the user ID.

5. The method of claim 1, wherein the random number is device specific.

6. The method of claim 1, wherein the encrypted data will be sent directly to the server if the automated analyser is online.

7. The method of claim 1, wherein a 2D barcode will be generated if the automated analyser system is offline.

8. The method of claim 7, wherein a display of the automated analyser shows the 2D barcode.

9. The method of claim 8, wherein the 2D barcode is read by a mobile phone related to the user ID for transmitting the combination of user ID and password as well as the random number by the mobile phone to the server in step c of claim 1.

* * * * *